United States Patent
Takada et al.

(10) Patent No.: US 8,894,264 B2
(45) Date of Patent: Nov. 25, 2014

(54) SPREAD ILLUMINATING APPARATUS

(71) Applicant: Minebea Co., Ltd., Kitasaku-gun, Nagano (JP)

(72) Inventors: Shohei Takada, Fukuroi (JP); Tomotaka Horikawa, Fukuroi (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 131 days.

(21) Appl. No.: 13/770,433

(22) Filed: Feb. 19, 2013

(65) Prior Publication Data
US 2013/0215644 A1   Aug. 22, 2013

(30) Foreign Application Priority Data
Feb. 21, 2012  (JP) .................... 2012-035152

(51) Int. Cl.
F21V 8/00   (2006.01)
(52) U.S. Cl.
CPC .................... G02B 6/0088 (2013.01)
USPC ........... 362/607; 362/608; 362/606; 362/615; 362/633
(58) Field of Classification Search
CPC .................................................. G02B 6/0088
USPC .................... 362/607, 609, 608, 615, 633
See application file for complete search history.

(56) References Cited

U.S. PATENT DOCUMENTS

| 5,788,356 | A | * | 8/1998 | Watai et al. ............... 362/621 |
| 7,520,652 | B2 | * | 4/2009 | Yamashita et al. ........ 362/608 |
| 7,771,100 | B2 | * | 8/2010 | Yamamoto et al. ........ 362/606 |
| 8,721,157 | B2 | * | 5/2014 | Hsiao et al. ............... 362/633 |
| 2012/0249885 | A1 | * | 10/2012 | Hosoki ....................... 348/725 |
| 2012/0257417 | A1 | * | 10/2012 | Lee et al. ................... 362/622 |

FOREIGN PATENT DOCUMENTS

| JP | A-2006-154320 | 6/2006 |
| JP | A-2009-265237 | 11/2009 |
| JP | A-2010-224000 | 10/2010 |

* cited by examiner

Primary Examiner — Stephen F Husar
Assistant Examiner — James Cranson, Jr.
(74) Attorney, Agent, or Firm — Oliff PLC

(57) ABSTRACT

A spread illuminating apparatus includes: a light guide plate with an emitting surface, a plurality of optical sheets laminated on the emitting surface, a light-blocking member that defines an effective area of the emitting surface, a light source, and a frame for accommodating the above constituents. The plurality of optical sheets are formed such that a position of an edge of each optical sheet on the incident light surface side of the light guide plate is spaced farther apart from the incident light surface of the light guide plate as moving toward a top layer of the optical sheets counted from the emitting surface, and the light-blocking member is fixed to each optical sheet and extends from the incident light surface side of the light guide plate so as to cover a vicinity of the edges of the plurality of optical sheets.

12 Claims, 6 Drawing Sheets

SPREAD ILLUMINATING APPARATUS

BACKGROUND OF THE INVENTION

1. Field of the Invention

The present invention relates to a spread illuminating apparatus used as an illumination means of a liquid crystal display device or the like.

2. Description of the Related Art

Currently, a liquid crystal display device is generally used as a display device of electronic devices such as personal computers and mobile telephones. Since liquid crystal is not a self-emitting display element, in a transmissive liquid crystal display device, for example, an illumination means that illuminates light on the liquid crystal panel is essential. Even in a semi-transmissive liquid crystal display device that uses external light, an auxiliary illumination means is provided to enable the device to be used in dark places. As such an illumination means for a liquid crystal display device, a spread illuminating apparatus that includes a light guide plate and a light source disposed on the side of the light guide plate as main constituent components is widely used in combination with liquid crystal display devices because it is advantageous that it is easy to be made thin. Further, a spread illuminating apparatus using a white LED as the light source has become common in accordance with recent technological advances in white light emitting diodes (LEDs) in order to make such spread illuminating apparatuses even more compact, thin and less power.

FIG. 6 illustrates one example of a display device equipped with such a spread illuminating apparatus. In FIG. 6, a display device 100 includes a plurality of plate-shaped (or sheet-shaped) members such as a liquid crystal display panel (LCD) 110 including a pair of glass substrates 112 and a pair of polarizing plates 114, a light guide plate 116 disposed on an underside surface side of the LCD 110 and where one (a top surface) of a pair of opposing principal surfaces is a light emitting surface, a reflective sheet 118 disposed on an underside surface side of the light guide plate 116, and a multi-layered (4 layers in the example of FIG. 6) optical sheet 120 disposed between the LCD 110 and the light guide plate 116 as constituent components. The above-described constituent components are accommodated together with a point light source 122 such as a white LED disposed facing an incident light surface 116a (FIG. 6C) of the light guide plate 116 in a frame-shaped inside part of a frame 124 made of synthetic resin material so as to constitute the integrated display device 100.

In the display device 100 having the above-described structure, the LCD 110 is fixed via two-sided tape 126 (FIG. 6B) to an attachment seat 124a that is formed to protrude toward the inside of the frame 124. The optical sheet 120 includes, for example, a diffusion sheet, a prism sheet, or the like, and is fixed via the two-sided tape 126 to the attachment seat 124a of the frame 124 similar to the LCD 110. Further, the reflective sheet 118 is also fixed via a two-sided tape 127 to an attachment seat 124b that is formed to protrude toward the inside of the frame 124. In addition, a light-blocking member 128 that covers the point light source 122 and the incident light surface 116a of the light guide plate 116 (FIG. 6C) is provided. Reference numeral 130 in FIG. 6C indicates a two-sided tape, and reference numeral 132 indicates a wiring substrate of the point light source (for example, refer to Japanese Patent Application Laid-Open No. 2010-224000).

In order to ensure accurate positioning of the optical sheet 120, a tab 120a as shown in FIG. 5A is formed on an edge of the optical sheet 120, and a recessed part 124c having a complementary shape for accepting the tab 120a is formed at a corresponding position on the frame 124. Therefore, as shown in FIG. 5A, positioning of the optical sheet 120 on the frame 124 is performed in the directions of arrows A and B which are orthogonal to each other (for example, refer to Japanese Patent Application Laid-Open No. 2009-265237 and Japanese Patent Application Laid-Open No. 2006-154320).

As explained above, the display device 100 has a structure where the necessary constituent parts are retained integrally and the necessary strength is secured by the frame 124 that is disposed surrounding the LCD 110 like a frame. Therein, from the perspective of the functionality of downsizing the display device 100 as well as the perspective of the design of the display device 100, there is a constant demand to narrow the frame of the display device 100. If the thickness (thickness in the direction of arrows B in FIG. 5A) of the frame 124 is reduced in order to facilitate this narrowing of the frame, it becomes difficult to secure the recessed part 124c for accepting the tab 120a of the optical sheet 120. Since the positioning of the optical sheet 120 may thereby become insufficient, this presents an obstacle to satisfying the demand to narrow the frame of the display device 100. Further, the tab 120a of the optical sheet 120 may also become a factor leading to unevenness in the brightness of the spread illuminating apparatus that constitutes the display device 100.

SUMMARY OF THE INVENTION

The present invention was created in consideration of the above-described problems, and an object of the present invention is to enable accurate positioning of the optical sheets in a spread illuminating apparatus without forming tabs in the optical sheets so as to facilitate further narrowing of the frame in the spread illuminating apparatus. Also, another object is to suppress the occurrence of unevenness in the brightness of the spread illuminating apparatus caused by the tabs of the optical sheets.

The below-described aspects exemplify structures of the present invention, and will be explained in an itemized manner in order to facilitate the understanding of the various structures of the present invention. Each item does not limit the technical scope of the present invention, and substitutions or deletions of a portion of the constituent components of each item as well as additions of other constituent components upon referring to the detailed description of the preferred embodiments are included within the technical scope of the invention.

In order to achieve the object described above, according to a first aspect of the present invention, there is provided a spread illuminating apparatus comprising: a light guide plate where one surface among a pair of opposing principal surfaces is an emitting surface, a plurality of optical sheets laminated on the emitting surface, a light-blocking member that defines an effective area of the emitting surface, a light source disposed facing an incident light surface of the light guide plate, and a frame for accommodating the light guide plate, the plurality of optical sheets, the light-blocking member, and the light source, wherein the plurality of optical sheets are formed such that a position of an edge of each optical sheet on the incident light surface side of the light guide plate is spaced farther apart from the incident light surface of the light guide plate as moving toward a top layer of the optical sheets counted from the emitting surface, and the light-blocking member is fixed to each optical sheet and extends from the incident light surface side of the light guide plate so as to cover a vicinity of the edges of the plurality of optical sheets.

With this structure, the plurality of optical sheets are formed such that the position of the edge of each optical sheet on the incident light surface side of the light guide plate is spaced farther apart from the incident light surface of the light guide plate as moving toward the top layer of optical sheets counted from the emitting surface. Thereby, when viewing the emitting surface of the light guide plate from the top, the edge of each optical sheet on the incident light surface side of the light guide plate is exposed without being covered by the optical sheet positioned on the layer above it. Further, on the exposed edges of the optical sheets, a light-blocking member extends from the incident light surface side of the light guide plate so as to cover the vicinity of the edges of the plurality of optical sheets. Thereby, the exposed portions in the vicinity of the edges of all of the optical sheets are fixed by the light-blocking member. For example, two-sided tape, an adhesive, or the like is used to fix the light-blocking member to the optical sheets.

In the first aspect of the present invention, an inclined surface is formed in a range of a predetermined width from the incident light surface of the light guide plate toward a center of the emitting surface of the light guide plate such that the thickness between the pair of opposing principal surfaces becomes thinner toward the center of the light guide plate, a range more toward the center than the inclined surface of the light guide plate has a constant thickness, and a range of a predetermined width of the plurality of optical sheets from the edge on the incident light surface side of the light guide plate is inclined following the inclined surface formed on the emitting surface of the light guide plate.

With this structure, a range of a predetermined width of the plurality of optical sheets from the edge on the incident light surface side of the light guide plate is inclined following an inclined surface formed in the emitting surface of the light guide plate. Thereby, the light-blocking member that extends from the incident light surface side of the light guide plate so as to cover the vicinity of the edges of the plurality of optical sheets is fixed along the inclined surfaces of the optical sheets. Thus, the formation of a steeply bent part in the light-blocking member extending from the incident light surface side of the light guide plate can be prevented, and the fixation strength of the light-blocking member to the optical sheets can be sufficiently secured.

In the first aspect of the present invention, an optical sheet positioned at the topmost layer counted from the emitting surface among the plurality of optical sheets is disposed in parallel to the emitting surface of the light guide plate in a portion where the thickness is constant, the topmost layer arranged without resting on the inclination of other optical sheets positioned below the topmost layer.

With this structure, the optical sheet positioned at the topmost layer counted from the emitting surface is disposed parallel to the emitting surface of the light guide plate in the portion where the thickness is constant. Thereby, a vicinity of the distal end of the light-blocking member that extends from the incident light surface side of the light guide plate so as to cover the vicinity of the edges of the plurality of optical sheets is also disposed parallel to the emitting surface of the light guide plate on the optical sheet positioned at the topmost layer. Further, by mounting an illuminated body such as an LCD polarizing film on the surface of the light-blocking member that is parallel to the emitting surface of the light guide plate, the stability of the illuminated body can be improved.

In the first aspect of the present invention, on the side of the incident light surface of the light guide plate, a top side edge of the topmost layer counted from the emitting surface among the plurality of optical sheets is positioned corresponding to a top side edge of an optical sheet disposed directly below the topmost layer in the laminating direction of the plurality of optical sheets.

With this structure, the positions in the laminating direction of the optical sheets of a top surface of the optical sheet positioned at the topmost layer and a top side edge of an edge on the incident light surface side of the light guide plate of the optical sheet positioned directly below the topmost layer are the same or approximately the same in the laminating direction of the optical sheets. Thereby, the position in the laminating direction of the optical sheets of a vicinity of the distal end of the light-blocking member is disposed parallel to the emitting surface of the light guide plate. In other words, the vicinity of the distal end of the light-blocking member is supported by not only the top surface of the optical sheet positioned at the topmost layer but also the top side edge of the edge of the optical sheet positioned directly below the topmost layer in a state where their positions in the laminating direction of the plurality of optical sheets are the same or approximately the same. Thus, the vicinity of the distal end of the light-blocking member is stably supported in parallel to the emitting surface of the light guide plate across a wider range. In the explanation above, the phrase "approximately the same" allows for some disparity within an acceptable range from the perspective of the dimensional precision and assembly precision of the constituent components.

In the first aspect of the present invention, on the side of the incident light surface of the light guide plate, a top side edge of an optical sheet disposed above the bottommost layer counted from the emitting surface among the plurality of optical sheets is positioned below a top side edge of the bottommost layer in the layering direction of the plurality of optical sheets.

With this structure, a position in the laminating direction of the plurality of optical sheets of a top side edge of an edge on the incident light surface side of the light guide plate of the optical sheet positioned directly above the bottommost layer counted from the emitting surface is disposed below a top side edge of an edge on the incident light surface side of the light guide plate of the optical sheet positioned at the bottommost layer. Thereby, the blocking member that extends from the incident light surface side of the light guide plate so as to cover the vicinity of the edges of the plurality of optical sheets forms an inclined surface that follows an inclined surface of the optical sheet positioned at the bottommost layer counted from the emitting surface. Further, the inclined surface of the light-blocking member is maintained up to a position where the light-blocking member crosses over from the optical sheet positioned at the bottommost layer to the optical sheet positioned directly above the bottommost layer. Thereby, the formation of a steeply bent part in the light-blocking member can be prevented, and the fixation strength of the light-blocking member to the optical sheets can be sufficiently secured.

In the first aspect of the present invention, the plurality of optical sheets include a first sheet positioned in a first layer counted from the emitting surface, a second sheet laminated on top of the first sheet, and a third sheet laminated on top of the second sheet.

With this structure, the plurality of optical sheets laminated on the emitting surface of the light guide plate include a first sheet, a second sheet, and a third sheet, and the sheets achieve the predetermined effects described in the first aspect.

According to a second aspect, there is provided a method for fixation of an optical sheet in a spread illuminating apparatus that includes a light guide plate where one surface among a pair of opposing principal surfaces is an emitting surface, a plurality of optical sheets laminated on the emitting surface, a light-blocking member that defines an effective area of the emitting surface, a light source disposed facing an incident light surface of the light guide plate, and a frame for accommodating the constituent components described above, where the plurality of optical sheets are formed such that a position of an edge of each optical sheet on the incident light surface side of the light guide plate is spaced farther apart from the incident light surface of the light guide plate as moving toward a top layer of the optical sheets counted from the emitting surface, and the light-blocking member extends from the incident light surface side of the light guide plate so as to cover a vicinity of the edges of the plurality of optical sheets and is fixed to the optical sheets.

According to the second aspect, an inclined surface is formed in a range of a predetermined width from the incident light surface toward the center of the emitting surface of the light guide plate such that the thickness between the pair of opposing principal surfaces becomes thinner toward the center of the light guide plate, a range more toward the center than the inclined surface is set to a constant thickness, and a range of a predetermined width of the plurality of optical sheets from an edge on the incident light surface side of the light guide plate is inclined following the inclined surface formed on the emitting surface of the light guide plate.

According to the second aspect, an optical sheet positioned at the topmost layer counted from the emitting surface among the plurality of optical sheets is disposed in parallel to the emitting surface of the light guide plate in a portion where the thickness is constant without resting on the inclined surface of an optical sheet positioned directly below the topmost layer.

According to the second aspect, the positions in the laminating direction of the plurality of optical sheets of a top surface of an optical sheet positioned at the topmost layer counted from the emitting surface among the plurality of optical sheets and a top side edge of an edge on the incident light surface side of the light guide plate of an optical sheet positioned directly below the topmost layer are the same or approximately the same.

According to the second aspect, a position in the laminating direction of the plurality of optical sheets of a top side edge of an edge on the incident light surface side of the light guide plate of an optical sheet positioned directly above the bottommost layer counted from the emitting surface among the plurality of optical sheets is disposed below a top side edge of an edge on the incident light surface side of the light guide plate of the optical sheet positioned at the bottommost layer.

According to the second aspect, the plurality of optical sheets include a first sheet positioned in a first layer counted from the emitting surface, a second sheet laminated on top of the first sheet, and a third sheet layered on top of the second sheet.

According to method for fixation of an optical sheet described in the second aspect, effects corresponding to the spread illuminating apparatus described in the first aspect are achieved.

With the above-described structures, the present invention enables accurate positioning of the optical sheets in a spread illuminating apparatus without forming tabs in the optical sheets so as to facilitate further narrowing of the frame in the spread illuminating apparatus. Also, the present invention can suppress the occurrence of unevenness in the brightness of the spread illuminating apparatus caused by the tabs of the optical sheets.

BRIEF DESCRIPTION OF THE DRAWINGS

FIG. 2 shows perspective views of the essential parts of the spread illuminating apparatus shown in FIG. 1.

FIG. 5 shows perspective views of the frame and optical sheets of spread illuminating apparatuses, FIG. 6 shows a liquid crystal display device including a conventional spread illuminating apparatus.

DETAILED DESCRIPTION OF THE PREFERRED EMBODIMENTS

Figure 1:
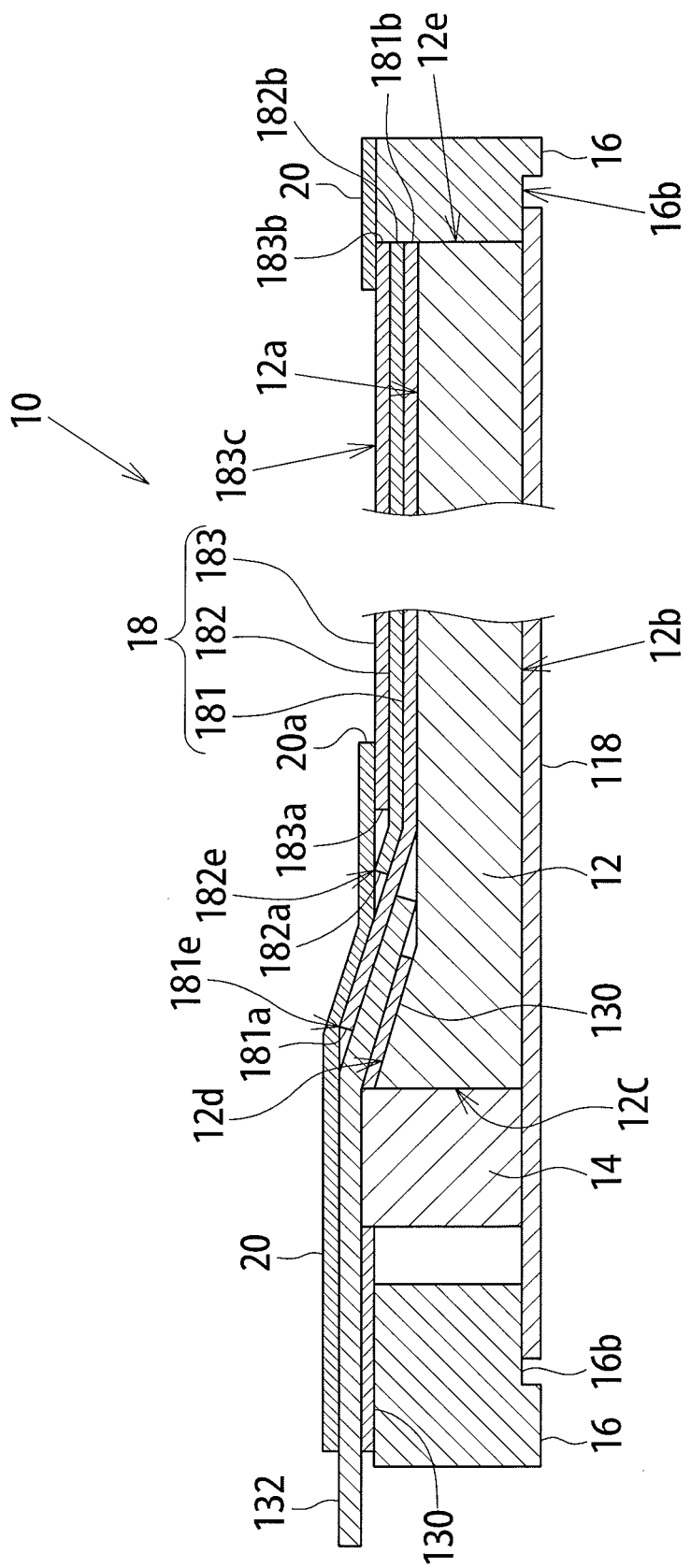
FIG. 1 is a cross-section view illustrating a spread illuminating apparatus according to an embodiment of the present invention.

Embodiments of the present invention will be explained below referring to the drawings. Portions identical to or corresponding to the conventional technology will be appropriately assigned the same reference numerals, and detailed explanations thereof will be omitted. The "up" and "down" directions in the following explanation indicate the up/down direction in a state where the spread illuminating apparatus in the explanation is laid out flat.

Figure 2A:
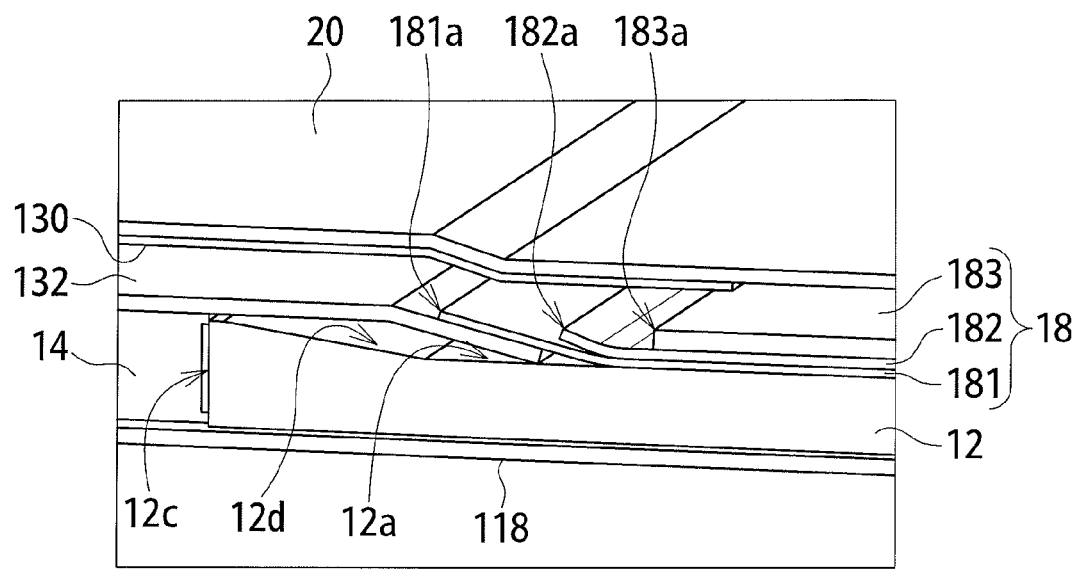
FIG. 2A illustrates a state before a light-blocking sheet is adhered to the optical sheets and FIG. 2B illustrates a state after the light-blocking sheet is adhered.
Figure 2B:
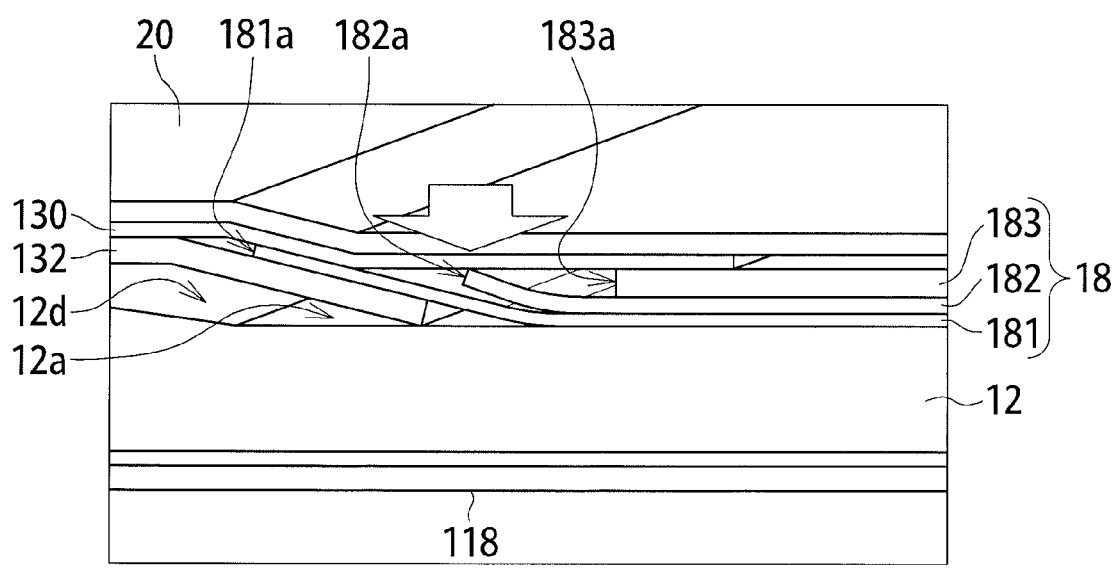
Figure 3:
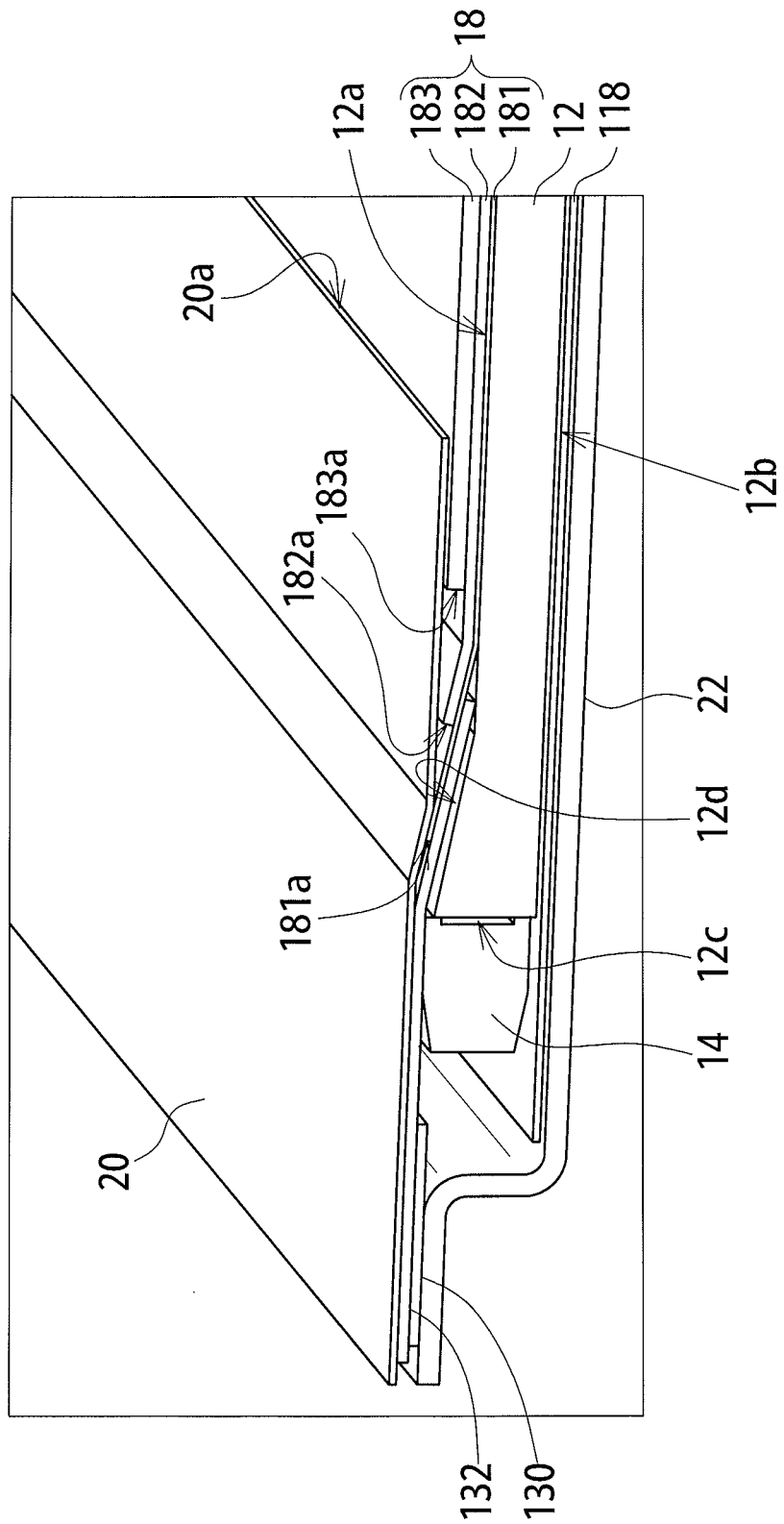
FIG. 3 is a perspective view of the essential parts showing an application example in a spread illuminating apparatus having a sheet metal frame.

FIGS. 1 to 3 illustrate a spread illuminating apparatus 10 of an embodiment of the present invention. The spread illuminating apparatus 10 includes a light guide plate 12 where one surface 12a among a pair of opposing principal surfaces 12a and 12b is an emitting surface, a plurality of optical sheets 18 laminated on the emitting surface 12a, a light-blocking member 20 that defines an effective area of the emitting surface 12a, an LED (which is a point light source) as a light source 14 disposed facing an incident light surface 12c of the light guide plate 12, and a frame 16 made of synthetic resin for accommodating the constituent components described above. Herein, the "effective area" of the emitting surface 12a defined by the light-blocking member 20 is an area excluding a "non-effective area" where decreases in the uniformity of emitted light and the like due to the influence of light reflected on the side end surface of the light guide plate 12 unavoidably occur in the vicinity of an edge of the emitting surface 12a of the light guide plate 12. In the spread illuminating apparatus of the present embodiment, when viewed from the top surface of the emitting surface 12a of the light guide plate 12, the non-effective area is covered and hidden by the light-blocking member 20 and light emitted from the effective area is effectively used to the maximum degree. For the light-blocking member 20, for example, a light-blocking sheet can be used.

Figure 6A:
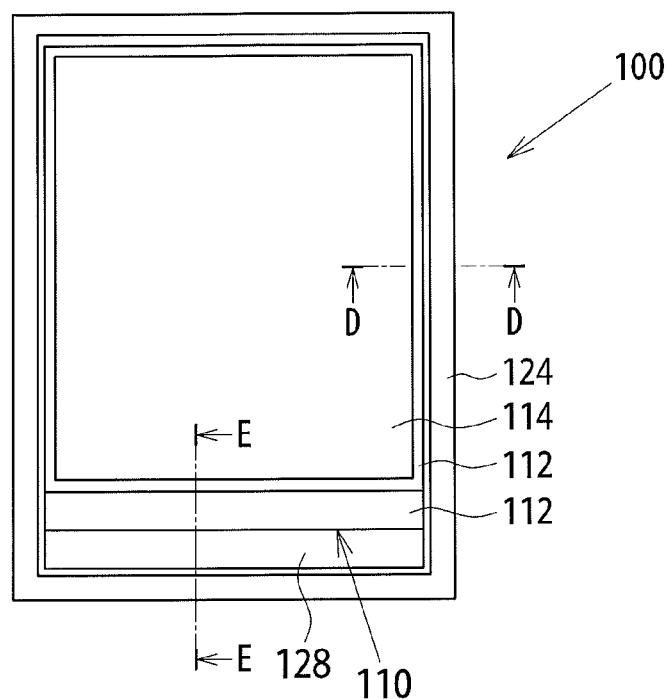
FIG. 6A is a plan view.
Figure 6B:
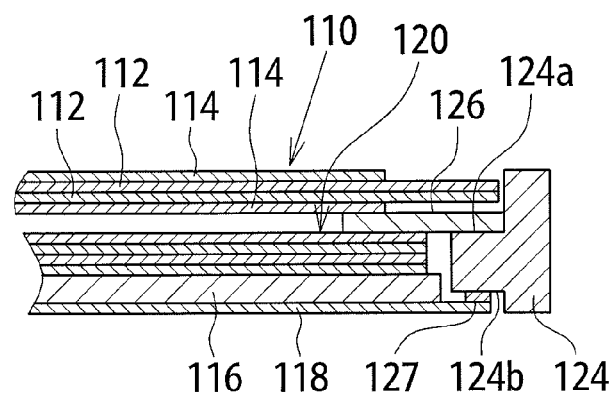
FIG. 6B is a cross-section view along line D-D of FIG. 6A.

The portion in FIG. 1 indicated by reference numeral 16b is an attachment seat for positioning a reflective sheet 118. The reflective sheet 118 is fixed to the attachment seat 16b using a two-sided tape 127 (refer to FIG. 6B).

In the present embodiment, the optical sheets 18 include a first sheet 181 positioned in a first layer counted from the emitting surface 12a of the light guide plate 12, a second sheet 182 laminated on top of the first sheet 181, and a third sheet 183 laminated on top of the second sheet 182. As one example, the first sheet 181 is a diffusion sheet, the second sheet 182 is a lower prism sheet, and the third sheet 183 is an upper prism sheet. In a state where edges 181b, 182b, and 183b of the optical sheets 181, 182, and 183 on the side of a surface 12e (refer to FIG. 1) that opposes the incident light surface 12c of the light guide plate 12 abut an inner circumferential surface of the frame 16 and are aligned when viewed from the top, the optical sheets 181, 182, and 183 are formed such that the positions of edges 181a, 182a, and 183a on the incident light surface 12c side of the light guide plate 12 are spaced farther apart from the incident light surface 12c of the light guide plate 12 as moving toward a top layer of the optical sheets counted from the emitting surface 12a of the light guide plate 12.

The light-blocking member 20 extends from the incident light surface 12c side of the light guide plate 12 so as to cover the vicinity of the edges 181a, 182a, and 183a of the optical sheets 181, 182, and 183 on the incident light surface 12c side of the light guide plate 12. The light-blocking member 20 is fixed by a two-sided tape 130 (refer to FIG. 2), an adhesive, or the like to the vicinity of the edges 181a, 182a, and 183a of the optical sheets 181, 182, and 183 on the incident light surface 12c side of the light guide plate 12.

An inclined surface 12d is formed in a range of a predetermined width from the incident light surface 12c toward the center of the emitting surface 12a of the light guide plate 12 such that the thickness between the pair of opposing principal surfaces becomes thinner toward the center of the light guide plate, and a range more toward the center than the inclined surface 12d is set to a constant thickness.

Among the optical sheets 181, 182, and 183, a range of a predetermined width from the edges 181a and 182a of the first sheet 181 and the second sheet 182 on the incident light surface 12c side of the light guide plate 12 is inclined following the inclined surface 12d formed on the emitting surface 12a of the light guide plate 12.

In the example shown in FIG. 1, a wiring substrate 132 of the light source 14 is inclined along the inclined surface 12d of the light guide plate 12 and fixed with the two-sided tape 130 to the inclined surface 12d. By laminating the first sheet 181 on the wiring substrate 132, a range of a predetermined width of the first sheet 181 from the edge 181a on the incident light surface 12c side of the light guide plate 12 is inclined following the inclined surface 12d of the light guide plate 12. By laminating the second sheet 182 on the inclined portion in the range of a predetermined width of the first sheet 181 from the edge 181a on the incident light surface 12c of the light guide plate 12, a range of a predetermined width of the second sheet 182 from the edge 182a on the incident light surface 12c side of the light guide plate 12 is also inclined following the inclined surface 12d of the light guide plate 12. The "range of a predetermined width" used above is defined by the positional relationship between the inclined surface 12d of the light guide plate 12 and the edges 181a and 182a of the sheets 181 and 182.

On the other hand, the third sheet 183 positioned at the topmost layer counted from the emitting surface 12a of the light guide plate 12 is disposed parallel to the emitting surface 12a of the light guide plate 12 in the portion where the thickness is constant without resting on the inclined surface of the second sheet 182 positioned directly below the third sheet 183.

As shown in FIG. 1, the positions in the laminating direction of the optical sheets 18 (the positions in the up-down direction) of a top surface 183c of the third sheet 183 positioned at the topmost layer counted from the emitting surface 12a of the light guide plate 12 among the optical sheets 181, 182, and 183 and a top side edge 182e of the edge 182a on the incident light surface 12c side of the light guide plate 12 of the second sheet 182 positioned directly below the third sheet 183 are the same or approximately the same.

Further, a position in the laminating direction of the optical sheets 18 (a position in the up-down direction) of a top side edge 182e of an edge 182a on the incident light surface 12c side of the light guide plate 12 of the second sheet 182 positioned directly above the bottommost layer counted from the emitting surface 12a of the light guide plate 12 among the optical sheets 181, 182, and 183 is disposed below a top side edge 181e of an edge 181a on the incident light surface 12c side of the light guide plate 12 of the first sheet 181 positioned at the bottommost layer.

FIG. 3 illustrates an example where the frame 16 made of synthetic resin shown in FIG. 1 is replaced with a sheet metal frame 22 as an application example of the present invention. In this application example, the light guide plate 12, the optical sheets 181, 182, and 183, and the light-blocking member 20 have the same structures as those shown in the examples of FIGS. 1 and 2. By using the sheet metal frame 22 as the frame, the frame itself has high strength compared to a resin frame. Although not illustrated in FIG. 3, a projection for positioning of the constituent components described above in the direction of a side surface of the light guide plate 12 that is orthogonal to the incident light surface 12c can be provided to the sheet metal frame 22 as necessary.

Figure 4:
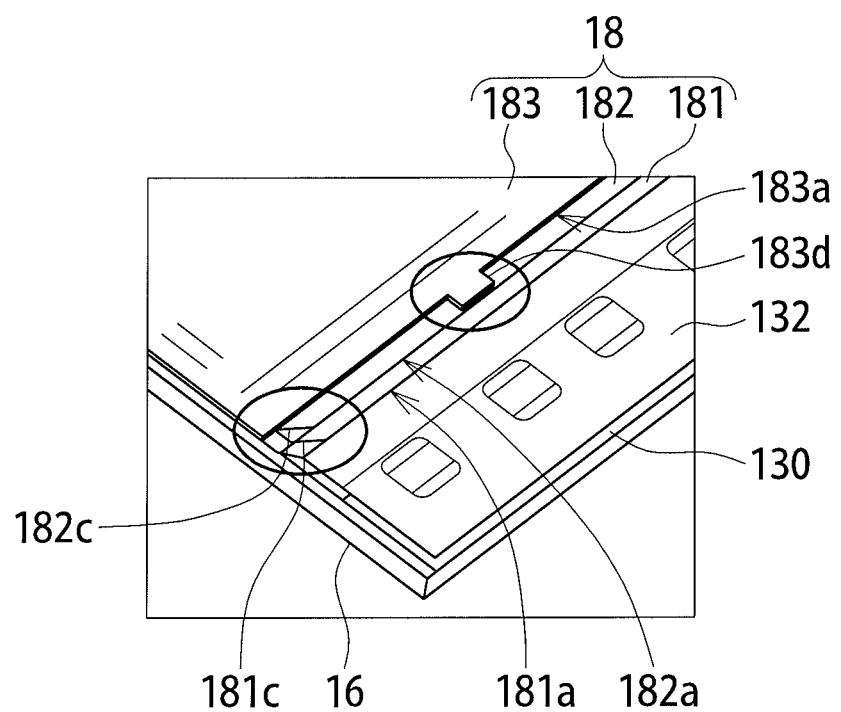
FIG. 4 is a perspective view illustrating a means for distinguishing between the top/bottom and up/down of the optical sheets.

In addition, as shown in FIG. 4, as a means for distinguishing between the top/bottom and up/down of the optical sheets, for example, C surface parts 181c and 182c can be provided to the edges 181a and 182a of the first and second sheets on the incident light surface side of the light guide plate and a tab 183d can be provided to the edge 183a of the third sheet 183 on the incident light surface side of the light guide plate at asymmetrical positions when viewed from the top as necessary.

According to this embodiment of the present invention that has the structure described above, the following operational effects can be achieved.

In this embodiment of the present invention, the plurality of optical sheets 181, 182, and 183 are formed such that the positions of the edges 181a, 182a, and 183a of the optical sheets 181, 182, and 183 on the incident light surface 12c side of the light guide plate 12 are spaced farther apart from the incident light surface 12c of the light guide plate 12 as moving toward the top layer of optical sheets counted from the emitting surface 12a of the light guide plate 12. Thereby, when viewing the emitting surface 12a of the light guide plate 12 from the top, each edge 181a, 182a, and 183a of the optical sheets 181, 182, and 183 on the incident light surface 12c side of the light guide plate 12 is exposed without being covered by the optical sheet positioned on the layer above it. Further, on the exposed edges 181a, 182a, and 183a of the optical sheets 181, 182, and 183, the light-blocking member 20 extends from the incident light surface 12c side of the light guide plate 12 so as to cover the vicinity of the edges 181a, 182a, and 183a of the plurality of optical sheets 18. Thereby, the vicinity of the edges 181a, 182a, and 183a of all of the optical sheets 181, 182, and 183 are fixed by the light-blocking member 20.

Further, a range of a predetermined width from the edges 181a and 182a of the first sheet 181 and the second sheet 182 on the incident light surface 12c side of the light guide plate 12 is inclined following the inclined surface 12d formed on the emitting surface 12a of the light guide plate 12. Thereby, the light-blocking member 20 that extends from the incident light surface 12c side of the light guide plate 12 so as to cover the vicinity of the edges 181a, 182a, and 183a of the plurality of optical sheets 181, 182, and 183 is fixed along the inclined surfaces of the optical sheets 181 and 182. Thus, the formation of a steeply bent part in the light-blocking member 20 that extends from the incident light surface 12c side of the light guide plate 12 can be prevented, and the fixation strength of the light-blocking member 20 to the optical sheets 181, 182, and 183 can be sufficiently secured.

Figure 6C:
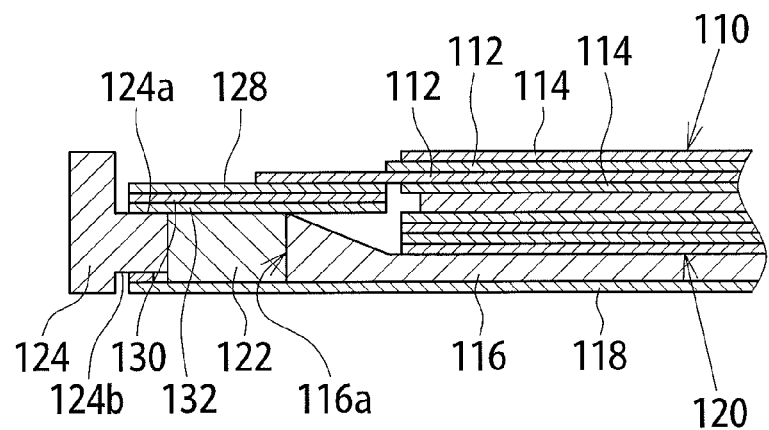
FIG. 6C is a cross-section view along line E-E of FIG. 6A.

Further, the third sheet 183 positioned at the topmost layer counted from the emitting surface 12a of the light guide plate 12 is disposed parallel to the emitting surface 12a of the light guide plate 12 in the portion where the thickness is constant. Thereby, a vicinity of a distal end 20a of the light-blocking member 20 that extends from the incident light surface 12c side of the light guide plate 12 so as to cover the vicinity of the edges 181a, 182a, and 183a of the plurality of optical sheets 181, 182, and 183 is also disposed parallel to the emitting surface 12a of the light guide plate 12 on the optical sheet 183 positioned at the topmost layer. Also, by mounting an illuminated body such as an LCD polarizing film (refer to the LCD 110, the pair of glass substrates 112, and the pair of polarizing plates 114 in FIG. 6) on the surface of the light-blocking member 20 that is parallel to the emitting surface 12a of the light guide plate 12, the stability of the illuminated body can be improved.

Further, in this embodiment of the present invention, the positions in the laminating direction of the optical sheets 18 (the positions in the up-down direction) of a top surface 183c of the third sheet 183 positioned at the topmost layer and a top side edge 182e of the edge 182a on the incident light surface 12c side of the light guide plate 12 of the second sheet 182 positioned directly below the third sheet 183 are the same or approximately the same. Thereby, the position in the laminating direction of the optical sheets 18 of the distal end 20a of the light-blocking member 20 is disposed parallel to the emitting surface 12a of the light guide plate 12. In other words, the vicinity of the distal end 20a of the light-blocking member 20 is supported by not only the top surface 183c of the third sheet 183 positioned at the topmost layer but also the top side edge 182e of the edge 182a of the second sheet 182 positioned directly below the third sheet 183 in a state where their positions in the laminating direction of the plurality of optical sheets 18 are the same or approximately the same. Thus, the vicinity of the distal end 20a of the light-blocking member 20 is stably supported in parallel to the emitting surface 12a of the light guide plate 12 across a wider range.

Further, a position in the layering direction of the plurality of optical sheets 18 (a position in the up-down direction) of the top side edge 182e of the edge 182a on the incident light surface 12c side of the light guide plate 12 of the second sheet 182 positioned directly above the bottommost layer counted from the emitting surface 12a of the light guide plate 12 is disposed below a top side edge 181e of an edge 181a on the incident light surface 12c side of the light guide plate 12 of the first sheet 181 positioned at the bottommost layer. Thereby, the light-blocking member 20 that extends from the incident light surface 12c side of the light guide plate 12 so as to cover the vicinity of the edges 181a, 182a, and 183a of the plurality of optical sheets 18 forms an inclined surface that follows the inclined surface of the first sheet 181 positioned at the bottommost layer. Also, the inclined surface of the light-blocking member 20 is maintained up to a position where the light-blocking member 20 crosses over from the optical sheet 181 positioned at the bottommost layer to the optical sheet 182 positioned directly above the optical sheet 181 (refer to the portion around reference numeral 182e of the light-blocking member 20 in FIG. 1). Thereby, the formation of a steeply bent part in the light-blocking member 20 can be prevented, and the fixation strength of the light-blocking member 20 to the optical sheets 18 can be sufficiently secured.

Figure 5A:
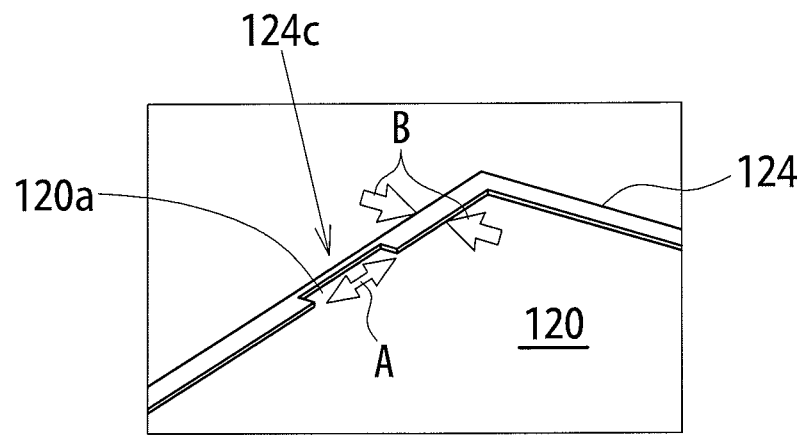
FIG. 5A illustrates a spread illuminating apparatus using a conventional optical sheet that has a tab as a reference example and FIG. 5B illustrates an embodiment of the present invention.
Figure 5B:
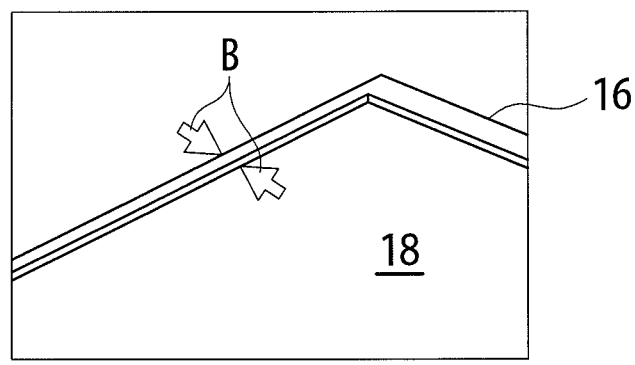

Due to the above-described operational effects, according to this embodiment of the present invention, the optical sheets 18 in the spread illuminating apparatus 10 can be positioned accurately without forming tabs (refer to the tab 120a and the recessed part 124c of the frame 124 for accepting the tab 120a in FIG. 5A) in the optical sheets 18 as shown in FIG. 5B. Thus, the thickness in the direction of arrows B in the frame 16 caused by providing tabs to the optical sheets 18 can be reduced so as to facilitate further narrowing of the frame in the spread illuminating apparatus 10. In addition, the occurrence of unevenness in the brightness of the spread illuminating apparatus 10 caused by providing tabs to the optical sheets 18 can be suppressed.

In this embodiment of the present invention, the plurality of optical sheets laminated on the emitting surface of the light guide plate include the first sheet 181, the second sheet 182, and the third sheet 183, and the sheets 18 achieve the operational effects described above. However, it should be understood that the same operational effects can be achieved even if the number of optical sheets 18 is increased or decreased.

What is claimed is:

1. A spread illuminating apparatus comprising:
a light guide plate where one surface among a pair of opposing principal surfaces is an emitting surface,
a plurality of optical sheets laminated on the emitting surface,
a light-blocking member that defines an effective area of the emitting surface,
a light source disposed facing an incident light surface of the light guide plate, and
a frame for accommodating the light guide plate, the plurality of optical sheets, the light-blocking member, and the light source,
wherein the plurality of optical sheets are formed such that a position of an edge of each optical sheet on the incident light surface side of the light guide plate is spaced farther apart from the incident light surface of the light guide plate as moving toward a top layer of the optical sheets counted from the emitting surface, and
the light-blocking member is fixed to each optical sheet and extends from the incident light surface side of the light guide plate so as to cover a vicinity of the edges of the plurality of optical sheets.

2. The spread illuminating apparatus according to claim 1, wherein an inclined surface is formed in a range of a predetermined width from the incident light surface of the light guide plate toward a center of the emitting surface of the light guide plate such that the thickness between the pair of opposing principal surfaces becomes thinner toward the center of the light guide plate,
a range more toward the center than the inclined surface of the light guide plate has a constant thickness, and
a range of a predetermined width of the plurality of optical sheets from the edge on the incident light surface side of the light guide plate is inclined following the inclined surface formed on the emitting surface of the light guide plate.

3. The spread illuminating apparatus according to claim 2, wherein an optical sheet positioned at the topmost layer counted from the emitting surface among the plurality of optical sheets is disposed in parallel to the emitting surface of the light guide plate in a portion where the thickness is constant, the topmost layer arranged without resting on the inclination of other optical sheets positioned below the topmost layer.

4. The spread illuminating apparatus according to claim 3, wherein, on the side of the incident light surface of the light guide plate, a top side edge of the topmost layer counted from the emitting surface among the plurality of optical sheets is positioned corresponding to a top side edge of an optical sheet disposed directly below the topmost layer in the laminating direction of the plurality of optical sheets.

5. The spread illuminating apparatus according to claim 2, wherein, on the side of the incident light surface of the light guide plate, a top side edge of an optical sheet disposed above the bottommost layer counted from the emitting surface among the plurality of optical sheets is positioned below a top side edge of the bottommost layer in the layering direction of the plurality of optical sheets.

6. The spread illuminating apparatus according to claim 1, wherein the plurality of optical sheets include a first sheet positioned in a first layer counted from the emitting surface, a second sheet laminated on top of the first sheet, and a third sheet laminated on top of the second sheet.

7. The spread illuminating apparatus according to claim 3, wherein, on the side of the incident light surface of the light guide plate, a top side edge of an optical sheet disposed above the bottommost layer counted from the emitting surface among the plurality of optical sheets is positioned below a top side edge of the bottommost layer in the layering direction of the plurality of optical sheets.

8. The spread illuminating apparatus according to claim 4, wherein, on the side of the incident light surface of the light guide plate, a top side edge of an optical sheet disposed above the bottommost layer counted from the emitting surface among the plurality of optical sheets is positioned below a top side edge of the bottommost layer in the layering direction of the plurality of optical sheets.

9. The spread illuminating apparatus according to claim 2, wherein the plurality of optical sheets include a first sheet positioned in a first layer counted from the emitting surface, a second sheet laminated on top of the first sheet, and a third sheet laminated on top of the second sheet.

10. The spread illuminating apparatus according to claim 3, wherein the plurality of optical sheets include a first sheet positioned in a first layer counted from the emitting surface, a second sheet laminated on top of the first sheet, and a third sheet laminated on top of the second sheet.

11. The spread illuminating apparatus according to claim 4, wherein the plurality of optical sheets include a first sheet positioned in a first layer counted from the emitting surface, a second sheet laminated on top of the first sheet, and a third sheet laminated on top of the second sheet.

12. The spread illuminating apparatus according to claim 5, wherein the plurality of optical sheets include a first sheet positioned in a first layer counted from the emitting surface, a second sheet laminated on top of the first sheet, and a third sheet laminated on top of the second sheet.

\* \* \* \* \*